(12) United States Patent
Kume et al.

(10) Patent No.: US 6,624,247 B2
(45) Date of Patent: Sep. 23, 2003

(54) LOW TEMPERATURE HEAT-SEALABLE POLYPROPYLENE-BASED FILM

(75) Inventors: Takanori Kume, Ichihara (JP); Shigeki Kishiro, Ichihara (JP); Eisuke Shiratani, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/901,608

(22) Filed: Jul. 11, 2001

(65) Prior Publication Data

US 2002/0040100 A1 Apr. 4, 2002

(30) Foreign Application Priority Data

Sep. 29, 2000 (JP) ......................... 2000-299331
Jul. 13, 2000 (JP) ......................... 2000-212691

(51) Int. Cl.$^7$ ..................... C08L 23/00; C08L 23/16
(52) U.S. Cl. ................. 525/88; 525/89; 525/95
(58) Field of Search ..................... 525/240, 88, 89, 525/95

(56) References Cited

U.S. PATENT DOCUMENTS 6,225,414 B1    5/2001    Kume et al.

FOREIGN PATENT DOCUMENTS

| EP | 0 577 407 A1 | 1/1994 |
|---|---|---|
| JP | 07-330923 A | 12/1995 |
| JP | 08-302110 A | 11/1996 |
| JP | 09-324022 A | 12/1997 |
| JP | 2882237 B2 | 2/1999 |
| JP | 11-302475 A | 11/1999 |

*Primary Examiner*—Jeffrey Mullis
(74) *Attorney, Agent, or Firm*—Sughrue Mion, PLLC

(57) ABSTRACT

A polypropylene-based resin film of a resin composition (C) comprising:

40 to 95 wt % of a propylene-based copolymer (A) selected from a propylene random copolymer (i) of propylene with ethylene and/or α-olefin and a propylene-based copolymer (ii) composed of 1 to 30 wt % of a component (a) obtained by copolymerizing propylene, an α-olefin and ethylene in a first step; and 70 to 99 wt % of a component (b) obtained by copolymerizing those in the subsequent step, in which the copolymerization ratio is different from that in the first step; and 5 to 60 wt % of a polypropylene-ethylene and/or α-olefin block copolymer (B) having a CXS of 5.0 wt % or more, wherein the CXS has a content of ethylene and/or the α-olefin of 14 to 35 mol %, and wherein the heat-seal temperature of the film of the (C) is lower by 3° C. or more than those of respective films of the (A) and (B).

9 Claims, No Drawings

LOW TEMPERATURE HEAT-SEALABLE POLYPROPYLENE-BASED FILM

BACKGROUND OF THE INVENTION

1. Filed of the Invention

The present invention relates to a polypropylene-based film excellent in low temperature heat sealability and transparency.

2. Description of Related Arts

Polypropylene resins are excellent in transparency, heat-resistance, food hygiene and the like, and therefore, widely utilized in such fields as films, sheets and the like. Recently, with increase in bag production speed in fields of food wrapping and the like, materials having low temperature heat sealability are desired. For giving a polypropylene low temperature heat sealability, for example, JP2882237B discloses a copolymer excellent in low temperature heat sealability in which the comonomer content is increased with a Ziegler-Natta catalyst. However, in the method of lowering a seal temperature by increasing comonomer content, when the comonomer content increases over a certain limit, the rigidity decreases and, the solvent extraction amount increases to lead to reduction in food hygiene, therefore, further improvements have been required to solve these problems.

Further, the polypropylene random copolymer having excellent low temperature heat sealability, disclosed in JP2882237B, has insufficient impact resistance.

Therefore, there is desired further improvement of low temperature heat sealability without lowering in food hygiene or impact resistance.

Further, JP09-324022A discloses a polypropylene block copolymer having increased comonomer content by a multi-stage polymerization, and having excellent transparency, flexibility, impact resistance at low temperature and food hygiene. However, further improvement of the material in low temperature heat sealability, is required.

SUMMARY OF THE INVENTION

The present inventors have intensively studied and resultantly found that the above-mentioned object can be attained by a polypropylene-based resin film composed of a resin composition which comprises a polypropylene-based random copolymer and a polypropylene-based block copolymer having a specific content of 20° C. xylene-soluble component and a specific comonomer concentration in 20° C. xylene-soluble component and in which the temperature showing a heat seal strength of a film obtained by film formation of the resin composition has a specific relation with the temperatures showing a heat seal strength of films obtained by film formation of these polypropylene-based random copolymer and polypropylene-based block copolymer, leading to completion of the present invention.

It is usually believed that the temperature showing heat seal strength of a film obtained by using two kinds of polymers having different temperatures showing heat seal strength of a film is between the temperatures showing heat seal strength of these polymers, and the present invention is based on such a finding that, by using a composition composed of a polymer satisfying the requirements of the present invention, a film having lower temperature showing heat seal strength than temperatures showing heat seal strength of respective polymers can be obtained.

An object of the present invention is to provide a polypropylene-based resin film excellent in low temperature heat sealability and transparency.

Another object of the present invention is to provide a polypropylene-based resin film excellent in food hygiene in addition to a low temperature heat sealability and transparency.

Further, another object of the present invention is to provide a polypropylene-based resin film excellent in impact resistance in addition to a low temperature heat sealability and transparency.

Still further, another object of the present invention is to provide a polypropylene-based multi-layer film, comprising at least one layer of the above-mentioned polypropylene-based film.

Other objects and advantages of the present invention will be apparent from the following descriptions.

The present invention relates to a polypropylene-based resin film composed of a resin composition (C) comprising:

40 to 95% by weight of a propylene-based copolymer (A) selected from the group consisting of a propylene-based random copolymer (i) of propylene with ethylene and/or α-olefins having 4 or more carbon atoms, and a propylene-based copolymer (ii) composed of 1 to 30% by weight of a copolymer component (a) having a content of α-olefins having 4 or more carbon atoms of 1 molt and less than 15 molt and an ethylene content of 5 molt or less, obtained by polymerizing propylene, an α-olefin having 4 or more carbon atoms and further optionally ethylene in a first step; and 70 to 99% by weight of a copolymer component (b) having a content of α-olefins having 4 or more carbon atoms of 15 to 30 molt and an ethylene content of 5 molt or less, obtained by polymerizing propylene, an α-olefin having 4 or more carbon atoms and further optionally ethylene in a second step or later steps; and 5 to 60% by weight of a polypropylene-based block copolymer (B) having a content of 20° C. xylene-soluble component (hereinafter, sometimes referred to as "CXS component") of 5.0% by weight or more, wherein the 20° C. xylene-soluble component is a copolymer of propylene with ethylene and/or an α-olefin having 4 or more carbon atoms, having a content of an ethylene unit derived from ethylene and/or an α-olefin unit derived from the α-olefin of 14 to 35 molt, wherein the heat seal temperature showing a seal strength of 300 g of the film of the resin composition is lower by 3° C. or more than those of respective films of the polypropylene copolymer (A) and the polypropylene-based block copolymer (B), and a multi-layer film comprising the film.

The present invention will be illustrated in detail below.

DETAILED DESCRIPTION OF THE INVENTION

The propylene-based random copolymer (i) used in the present invention is a random copolymer obtained by randomly copolymerizing propylene with at least one comonomer selected from the group consisting of ethylene and α-olefins having 4 or more of carbon atoms, preferably 4 to 20 carbon atoms.

Examples of the α-olefin include, for example, 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-buene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, 1-dodecene and the like are exemplified, and preferable are 1-butene, 1-pentene, 1-hexene and 1-octene, further preferable are 1-butene and 1-hexene from the standpoints of copolymerization property and economy and the like.

Examples of the propylene-based random copolymer (i) include, for example, a propylene-ethylene random copolymer, propylene-1-butene random copolymer, propylene-1-hexene random copolymer, propylene-ethylene-1-butene random copolymer, propylene-ethylene-1-hexene random copolymer and the like, and a propylene-ethylene random copolymer, propylene-1-butene random copolymer and propylene-ethylene-1-butene random copolymer are preferable.

When the propylene-based random copolymer (i) is a random copolymer of propylene with ethylene, the ethylene unit content is preferably from 5.5 to 10.0 mol %, more preferably from 6.5 to 9.0 mol % from the standpoint of the amount of solvent-extracting components, namely, food hygiene.

When the propylene-based random copolymer (i) used in the present invention is a random copolymer of propylene with an α-olefin, the α-olefin unit content is preferably from 11.5 to 25.0 mol %, more preferably from 14.0 to 20.0 mol % from the standpoint of low temperature heat sealability or stable production of the random copolymer.

When the propylene-based random copolymer (i) used in the present invention is a copolymer of propylene, ethylene and the α-olefin, the total content of ethylene unit and α-olefin unit is preferably from 2.0 to 35 mol %, more preferably from 6.5 to 26 mol %, most preferably from 8 to 23 mol % from the standpoint of low temperature heat sealability or food hygiene.

The fusion peak temperature of the propylene-based random copolymer (i) measured by using a differential scanning calorimeter (DSC) is preferably 140° C. or less, more preferably 135° C. or less from the standpoint of low temperature heat sealability.

Particularly, when the propylene-based random copolymer (i) is used, the film excellent in food hygiene in addition to excellent low temperature heat sealability and transparency, can be obtained.

Further, the propylene-based copolymer (ii) used in the present invention is composed of a copolymer containing a copolymer component (a) obtained by copolymerizing propylene, an α-olefin having 4 or more carbon atoms and optionally ethylene in a first step, and a copolymer component (b) obtained by copolymerizing propylene, an α-olefin having 4 or more carbon atoms and optionally ethylene in a second step or later steps. The component (a) is preferably a copolymer component obtained by copolymerizing propylene with an α-olefin having 4 or more carbon atoms, and the component (b) is preferably a copolymer component obtained by polymerizing propylene with an α-olefin having 4 or more carbon atoms.

The content of the component (a) is from 1 to 30% by weight, preferably from 5 to 30% by weight, more preferably from 5 to 20% by weight. The content of the component (b) is from 70 to 99% by weight, preferably from 70 to 95% by weight, more preferably from 80 to 95% by weight.

When the content of the component (a) is less than 1% by weight, properties of polymer powder formed in polymerization may be deteriorated to decrease productivity, and when the content of the component (a) is over 30% by weight, the low temperature heat sealability of a film may be insufficient.

The content of the unit of the α-olefin having 4 or more carbon atoms contained in the component (a) is from 1 mol % to less than 15 mol %, preferably from 5 to less than 15 molt, more preferably from 5 to 10 mol %. When the content of the α-olefin unit contained in the component (a) is less than 1 mol %, processability may be insufficient, and when 15 mol % or more, it may be difficult in some cases to stably produce the component (a).

The content of the α-olefin unit contained in the component (b) is from 15 to 30 mol %, preferably from 15 to 25 mol %. When the content of the α-olefin unit contained in the component (b) is less than 15 mol %, the low temperature heat sealability of a film may be insufficient, and when over 30 mol %, the rigidity of a film may decrease.

The content of the ethylene unit in the component (a) is 5 mol % or less, preferably 3 mol % or less. The ethylene unit content in the component (B) is 5 mol % or less, preferably 3 mol % or less. When the content of the ethylene unit in the component (a) or the component (b) is over 5 mol %, a film may be whitened and rigidity thereof may decrease with the lapse of time.

As the α-olefin having 4 or more carbon atoms, α-olefins having 4 to 20 carbon atoms are preferable. Examples of the α-olefin having 4 or more carbon atoms are selected from aforementioned examples of the α-olefin used in the propylene-based random copolymer (i).

As the component (a) or the component (b), for example, a propylene-1-butene copolymer component, propylene-1-hexene copolymer component, propylene-ethylene-1-butene copolymer component, propylene-ethylene-1-hexene copolymer component and the like are listed, and preferable are a propylene-1-butene copolymer component and propylene-1-hexene copolymer component. The component (a) and the component (b) may be the same or different in combination of the monomers to be copolymerized.

As the propylene-based copolymer (ii) used in the present invention, for example, a (propylene-1-butene)-(propylene-1-butene) copolymer, (propylene-1-butene)-(propylene-ethylene-1-butene) copolymer, (propylene-ethylene-1-butene)-(propylene-1-butene) copolymer, (propylene-ethylene-1-butene)-(propylene-ethylene-1-butene) copolymer, (propylene-1-hexene)-(propylene-1-hexene) copolymer and the like are listed, preferable are a (propylene-1-butene)-(propylene-1-butene) copolymer and (propylene-1-hexene)-(propylene-1-hexene) copolymer, and further preferable is a (propylene-1-butene)-(propylene-1-butene) copolymer. Particularly, when the propylene-based copolymer (ii) is used, the film excellent in impact resistance in addition to excellent low temperature heat sealability and transparency, can be obtained.

Production of the propylene-based copolymer (ii) used in the present invention can be conducted by multi-step polymerization composed of a first step, and a second step or later steps, using a known polymerization catalyst in a known polymerization method.

As the polymerization catalyst, Ziegler-Natta type catalysts, metallocene-based catalysts and the like are listed, and preferable are catalysts containing Ti, Mg and a halogen as essential components. For example, there are Ti—Mg-based catalysts composed of a solid catalyst component obtained by combining a magnesium compound with a Ti compound, and catalyst systems composed of this solid catalyst component and an organoaluminum compound, and if necessary, tertiary components such as an electron donative component and the like, and there are exemplified catalyst systems described in JP61-218606A, JP61-287904A and JP07-216017A, and the like.

The organoaluminum compound is not particularly restricted, and preferable are triethylaluminum, triisobutylaluminum, a mixture of triethylaluminum and diethylaluminum chloride, and tetraethyldialumoxane.

The electron donative compound is not particularly restricted, and cyclohexylethyldimethoxysilane, tert-butyl-n-propyldimethoxysilane, tert-butylethyldimethoxysilane and dicyclopentyldimethoxysilane are preferable.

As the polymerization method, there are listed a solvent polymerization method using an inactive solvent typified by hydrocarbon compounds such as hexane, heptane, octane, decane, cyclohexane, methylcyclohexane, benzene, toluene, xylene and the like, a bulk polymerization method using as a solvent a liquefied monomer, a gas phase polymerization method conducted in monomers in the form of gas, and the like, and preferable are a bulk polymerization method and gas phase polymerization method in which post treatment and the like are easy. These polymerization methods may be batch-wise or continuous.

In the method of producing the propylene-based copolymer (ii) used in the present invention, polymerization is conducted in multi-stage composed of a first step and later steps, in the above-mentioned polymerization method. The polymerization method of a first step and the polymerization method of a second step or later steps may be the same or different, and preferably, from the standpoints of polymerization activity and easiness of post-treatment, the first step is a step in which polymerization is conducted in the absence of an inert solvent and the second or later steps are a step in which polymerization is conducted in gas phase. Polymerization of the first step and polymerization of the second or later step may be conducted in the same polymerization reactor, or conducted in different polymerization reactors.

As the method of producing the propylene-based copolymer (ii) used in the present invention, there are listed, for example, a solvent—solvent polymerization method, bulk—bulk polymerization method, gas phase-gas phase polymerization method, solvent-gas phase polymerization method, bulk-gas phase-gas phase polymerization method, solvent-gas phase-gas phase polymerization method, bulk-gas phase-gas phase polymerization method and the like, and preferable are a bulk-gas phase polymerization method, gas phase-gas phase polymerization method and bulk-gas phase-gas phase polymerization method.

The polymerization temperature in the first step is not particularly restricted, usually from 20 to 150° C., and from the standpoints of productivity and control of contents of the component (a) and the component (b), preferably from 35 to 95° C. The polymerization temperature of the second or later steps may be the same as or different from the polymerization temperature of the first step, and usually from 20 to 150° C., preferably from 35 to 95° C.

In the method of producing the propylene-based copolymer (ii) used in the present invention, catalyst deactivation, de-solvent, de-monomer, drying, granulation and the like as post-treatments may be conducted, if necessary.

The polypropylene-based block copolymer (B) used in the present invention is a propylene block copolymer composed of a copolymer part (x part) obtained by randomly connecting a repeating unit derived from propylene (propylene unit) with an ethylene unit and/or an α-olefin unit, and a copolymer part (y part) obtained by randomly connecting a propylene unit with an ethylene unit and/or an α-olefin unit, having a different structure from that of the above-mentioned x part.

As the α-olefin used in the present invention, the above-mentioned α-olefins are listed. Further, as the polypropylene-based block copolymer (B) used in the present invention, there are listed, for example, a (propylene-ethylene)-(propylene-ethylene) block copolymer, (propylene-ethylene)-(propylene-1-butene) block copolymer, (propylene-1-butene)-(propylene-ethylene) block copolymer, (propylene-1-butene)-(propylene-1-butene) block copolymer, (propylene-1-butene)-(propylene-ethylene-1-butene) block copolymer, (propylene-ethylene)-(propylene-ethylene-1-butene) block copolymer, (propylene-ethylene-1-butene)-(propylene-ethylene) block copolymer, (propylene-ethylene-1-butene)-(propylene-ethylene-1-butene) block copolymer and the like, and preferable are a (propylene-ethylene)-(propylene-ethylene) block copolymer, (propylene-ethylene)-(propylene-ethylene-1-butene) block copolymer and (propylene-1-butene)-(propylene-ethylene-1-butene) block copolymer.

The content of 20° C. xylene-soluble component (CXS component) in the polypropylene-based block copolymer (B) used in the present invention is 5.0% by weight or more, preferably from 5.0 to 40% by weight. When the content of the CXS component is less than 5% by weight, the low temperature heat sealability may be insufficient and the impact resistance may be inferior.

The content of an ethylene unit and/or α-olefin unit in the CXS component of the polypropylene-based block copolymer (B) is from 14 to 35 mol %. When the concentration of ethylene and/or α-olefin in the CXS component is less than 14 mol %, the low temperature heat sealability may be insufficient, and when over 35 mol %, the transparency may decrease.

The intrinsic viscosity $[\eta]^{(B)}_{CXS}$ of the CXS component in the propylene-based copolymer (B) is preferably 2.0 dl/g or less from the standpoint of transparency.

The polypropylene-based block copolymer (B) is preferably a polypropylene-based block copolymer in which the x part is a copolymer part which contains a propylene repeating unit, an ethylene repeating unit, and further optionally an α-olefin repeating unit, and the y part having a different structure from that of the x part is a copolymer part which contains a propylene repeating unit, an ethylene repeating unit, and further optionally an α-olefin repeating unit.

When the x part of the polypropylene-based block copolymer (B) is a copolymer part which contains a propylene repeating unit, an ethylene repeating unit, and further optionally an α-olefin repeating unit, the ethylene content is preferably from 2.0 to 9.0 mol %, more preferably from 4.0 to 7.0 mol % from the stand point of low temperature heat sealability or stable production of the polypropylene-based block copolymer (B). Further, the α-olefin content is preferably from 0 to 16.0 mol % from the standpoint of transparency.

The content of the x part in the polypropylene-based block copolymer (B) is preferably from 40 to 85% by weight, more preferably from 45 to 80% by weight from the standpoint of low temperature heat sealability or stable production of the polypropylene-based block copolymer (B).

When the y part having a different structure from that of the x part is a copolymer part which contains a propylene repeating unit, an ethylene repeating unit, and further optionally an α-olefin repeating unit, the ethylene content of the y part is preferably from 10.0 to 24.0 mol %, more preferably from 11.5 to 21.0 mol % from the stand point of low temperature heat sealability. Further, the α-olefin content is preferably from 0 to 29.0 mol % from the standpoint of food hygiene.

The content of the y part in the polypropylene-based block copolymer (B) is preferably from 15 to 60% by weight, further preferably from 20 to 55% by weight from the standpoint of low temperature heat sealability or stable production of the polypropylene-based block copolymer (B).

The intrinsic viscosity $[\eta]^{(B)}_{y\ part}$ of the y part is preferably from 2.0 to 5.0 dl/g, more preferably from 2.5 to 4.5 dl/g from the standpoint of the amount of solvent-extraction components, namely, food hygiene, or transparency.

The ratio of the intrinsic viscosity of the y part ($[\eta]^{(B)}_{y\ part}$) to the limiting viscosity of the x part ($[\eta]^{(B)}_{x\ part}$) is preferably from 0.5 to 1.8 ($0.5 \leq [\eta]^{(B)}_{y\ part}/[\eta]^{(B)}_{x\ part} \leq 1.8$) from the standpoint of balance of low temperature heat sealability, food hygienic property and transparency.

The polypropylene-based block copolymer (B) is particularly preferably a polypropylene-based block copolymer in which the x part is a copolymer part composed of a propylene unit and an ethylene unit, and the y part having a different structure from that of the x part is a copolymer part composed of a propylene unit and an ethylene unit.

The methods of producing the propylene-based random copolymer (i) and the propylene-based block copolymer (B) are not particularly restricted, and production methods using a known catalyst are generally listed. For example, a method in which a known catalyst for stereoregular polymerization of propylene is used is exemplified.

As the catalyst for stereoregular polymerization of propylene, the aforementioned catalysts used for producing the propylene-based copolymer (ii) can be used.

The method of polymerizing the propylene-based random copolymer (i) and propylene-based block copolymer (B) are not particularly restricted, and there are listed a solvent polymerization method conducted in the presence of an inert solvent, a bulk polymerization method conducted in the presence of a liquefied monomer, a gas phase polymerization method conducted in the substantial absence of a liquid medium, and the like. A gas phase polymerization method is preferable. Further, a polymerization method combining two of more of the above-mentioned polymerization methods, a one-stage polymerization method and a multi-stage polymerization method including two or more stages, and the like, can also be used.

The propylene-based block copolymer (B) is a copolymer produced by copolymerizing propylene with ethylene and/or the α-olefin, in predetermined amounts so that the content of respective repeating units becomes within the aforementioned range, in the presence of the polymerization catalyst in a first step to obtain the X part in the (B), and subsequently copolymerizing propylene with ethylene and/or the α-olefin, in predetermined amounts so that the content of respective repeating units becomes within the aforementioned range in a second step or later steps to obtain the Y part in the (B).

The method of producing the propylene-based block copolymer (B) is not particularly restricted, and for example, methods described in JP09-324022A and JP11-100421A, and the like, are listed.

In the method of producing the propylene-based copolymer (B) or (i) used in the present invention, catalyst deactivation, de-solvent, de-monomer, drying, granulation and the like as post-treatments may be conducted, if necessary.

The resin composition (C) used in the present invention is a resin composition comprises 40 to 95% by weight (preferably 60 to 95% by weight) of the polypropylene-based random copolymer (A) and 5 to 60% by weight (preferably 5 to 40% by weight) of the polypropylene-based block copolymer (B). Herein, the total content of the (A) and (B) is 100% by weight. When the content of the polypropylene-based random copolymer (A) is less than 40% by weight or more than 95% by weight, low temperature heat sealability may be insufficient.

The temperature showing heat seal strength (hereinafter, sometimes abbreviated as "HST") of 300 g of a film of the resin composition (C) is required to be lower than the temperature showing HST of 300 g of a film of the propylene-based copolymer (A) (TA° C.) and the temperature showing HST of 300 g of a film of the propylene-based block copolymer (B) (TB° C.), by at least 3° C. When the difference is less than 3° C., the low temperature heat sealability becomes insufficient.

Herein, preparation of a film used for measurement and measurement of HST are carried out in the same manner as in Examples described below.

The combination of the propylene-based copolymer (A) with the propylene-based block copolymer (B), in which the above relation is satisfied, can be selected by a trial-and-error method.

The method of producing the resin composition (C) is not particularly restricted, and there are listed a method in which the propylene-based copolymer (A) and propylene-based block copolymer (B), separately polymerized, are melt-kneaded respectively by dry blend or melt blend and the like.

The melt flow rate (hereinafter, sometimes abbreviated as "MFR") measured at 230° C. under a load of 21.18N according to JIS K7210 of the resin composition (C) is preferably from 0.1 to 50 g/10 minutes, more preferably from 1 to 20 g/10 minutes, from the standpoint of flowability or film formability.

The MFR of the resin composition (C) may be changed by a known method during melt-kneading. For example, the flowability may be adjusted by changing the MFR of the resin composition (C) by adding an organic peroxide to the polypropylene-based copolymer (A) and/or polypropylene-based block copolymer (B) so far as the object and effect of the present invention are not deteriorated.

In the resin composition (C), additives and other resins may also be added so far as the object and effect of the present invention are not deteriorated. As the additives, for example, antioxidants, ultraviolet absorbers, antistatic agents, lubricants, nucleating agents, stickers, ant-fogging agents, and the like are listed.

As the other resins, for example, ethylene-based resins, butene-based resins, petroleum resins, styrene-based resins and the like are listed. From the standpoint of high speed film formability, it is preferable to add a high density polyethylene resin in an amount of 5% by weight or less, and from the standpoint of adhesive property, it is preferable to added an ethylene-methyl (meth)acrylate resin in an amount of 5% by weight or less.

As the method of producing the film of the present invention, there are listed single film formation methods using an inflation method, T die method, calender method and the like, or methods in which the film is formed as at least one layer of a multi-layer structure with a different resin, and the like. As the method of forming a multi-layer structure, there are listed an extrusion lamination method, heat lamination method, dry lamination method and the like usually used. Further, a method of producing a film by stretching a film or sheet obtained by previous molding is exemplified, and examples of the stretching method include uni-axial or bi-axial stretching methods by a roll stretching method, tenter stretching method, tubular stretching method and the like. A non-stretching co-extrusion molding method and bi-axial stretching method are preferable from the standpoint of balance of film properties such as the low temperature heat sealability, transparency, rigidity and the like.

EXAMPLES

The following Examples illustrate the present invention specifically, but the present invention is not limited thereto. Methods of preparing samples used in the Examples and Comparative Examples and methods of measuring physical properties thereof are descried below.

(1) Sample Preparation Method (1-1) Pelletization

A polypropylene-based copolymer (A) and a polypropylene-based block copolymer (B) were melt-kneaded at 220° C. to make pellets of a resin composition (C).

(1-2) Film Processing

The resulted pellets of the resin composition (C) were extruded using a φ 50 mm extruder equipped with a 400 mm width coat hunger type T die at a resin temperature of 250° C. and a discharge amount of 12 kg/hr, and cooled by an air chamber cooling method at a chill roll temperature of 40° C. and a line speed of 20 m/min to produced a film of 30 μm.

(2) Measurement of Physical Properties of Polypropylene-based Copolymer (A) and Polypropylene-based Block Copolymer (B) used in Examples and Comparative Examples.

(2-1) Melt Flow Rate (MFR, Unit: g/10 min.)

It was measured at a temperature of 230° C. and a load of 21.18 N according to JIS K7210.

(2-2) Intrinsic Viscosity [η] (unit: dl/g)

The reduced viscosity was measured using an Ubbellohde type viscometer at three concentrations of 0.1, 0.2 and 0.5 g/dl. It was measured using tetralin as a solvent at a temperature of 135° C. The limiting viscosity was obtained by a calculation method described in "Kobunshi Yoeki, Kobunshi Jikken Kagaku 11 (Polymer Solution, Polymer Experimental Chemistry 11)" (published by Kyoritsu Shuppan K.K., 1982), page 491, namely, by an extrapolation method in which reduced viscosities are plotted against concentrations and the concentration is extrapolated to zero.

(2-3) Ethylene Content (Unit: mol %)

It was determined by measurement using a $^{13}$C-NMR method described in "Polymer Handbook" (published by Kinokuniya Shoten, 1995), page 616.

(2-4) 20° C. Xylene-soluble Component (CXS Component) (Unit: % by Weight)

5 Gram of a polypropylene-based block copolymer (B) was completely dissolved in 500 ml of boiling xylene, then, the solution was cooled down to 20° C., and allowed to stand for 4 hours or more. Then, this was filtrated to give a precipitate and a solution, and the filtrate was dried and solidified to obtain a solid under reduced pressure at 70° C., and the weight of the solid was measured.

(2-5) Fusion Peak Temperature (TM) (Unit: ° C.)

10 mg of a sample was previously melted under a nitrogen atmosphere at 220° C. for 5° C. using a differential scanning calorimeter (DSC-V11, manufactured by Perkin Elmer, Ltd.), then, the melted sample was cooled to 40° C. at a cooling rate of 5° C./min. Then, the melted sample was heated at a rate of 5° C./min. to obtain a fusion heat absorption curve, and the temperature at the maximum peak in this curve was measured. The melting point of indium measured at a heating rate of 5° C./min. using this measuring apparatus was 156.6° C.

(3) Method of Measuring Film Physical Properties (3-1) Heat Seal Temperature (HST) (Unit: ° C.)

A 30 μm film was obtained by extruding a resin using a φ 50 mm extruded equipped with a 400 mm width coat hunger type T die at a resin temperature of 250° C. and a discharge amount of 12 kg/hr, and cooling the resin by an air chamber cooling mode at a chill roll temperature of 40° C. and a line speed of 20 m/min. The resulted film was stabilized at 23° C. for 24 hours or more, then, subjected to heat sealing. The heat sealing was effected by using a heat gradient tester manufactured by Toyo Seiki K.K. at an interval of 2° C. under conditions of a width of 15 mm, a sealing pressure of 1 kg/cm$^2$ and a time of 1 second. The resulted film was left at 23° C. for 24 hours or more, then, heat seal strengths were measured by effecting T-type peeling at a speed of 200 mm/min. at 23° C. using a tensile tester, and the temperature when the heat seal strength was 300 g was determined.

(3-2) Haze (Unit: %)

It was measured according to JIS K7105.

(3-3) Young Modulus (YM) (Unit: kg/cm$^2$)

Test pieces having a width of 20 mm were sampled along the machine direction (MD) and the transverse direction (TD) from a film conditioned for 7 days in a constant temperature room of 23° C. (humidity of 50%) after film formation, and an S—S curve was made by a tensile tester (YZ100×2CTII, manufactured by Yasuda Seiki Seisakusho K.K.) at a chuck distance of 60 mm and a tensile speed of 5 mm/min., and the initial elastic modulus was measured.

(3-4) Solvent Resistance (Unit: % by Weight)

The amount extracted by n-hexane at 50° C. of a film having a thickness of 60 μm used in Example 2 was measured according to a method described in FDA177.1520 (d)(3)(ii), to find it was 4.0% by weight.

(3-5) Impact Strength (Unit: kg-cm/mm)

The impact strength of a film was measured using a hemispherical impact head having a diameter of 15 mm at 0° C., using a film impact tester manufactured by Toyo Seiki.

(4) Content (Unit: % by weight) of Copolymer Component (a) and Component (b) Contained in Propylene-based Copolymer (ii)

It was calculated from material balance.

(5) Content (Unit: mol %) of 1-butene Contained in Copolymer Component (a) and Component (b)

The contents of 1-butene contained in the component (a) and the propylene-based copolymer (ii) were obtained by IR spectral measurement described in Polymer Handbook (published from Kinokuniya Shoten, 1995), page 619. The content of 1-butene contained in the component (B) was calculated according to the following formula using the contents of the component (a) and the component (b) and the contents of 1-butene contained in the component (a) and the propylene-based copolymer (ii).

(1-butene content in component (b))={(1-butene content in propylene-based copolymer (ii))×100−(1-butene content in component (a)) X (content of component (b))}/(content of component (b))

The physical properties of A-1 and A-2 used as the polypropylene-based random copolymer (A) in the examples and comparative examples are shown in Table 1, and the physical properties of B-1 to B-3 used as the polypropylene-based copolymer (B) are shown in Table 2.

TABLE 1

| Copolymer (A) | Ethylene content (mol %) | Butene-1 content (mol %) | Heat seal temperature (° C.) | Fusion Peak temperature (° C.) | MFR (g/10 min.) |
|---|---|---|---|---|---|
| A-1 | 5.9 | 3.0 | 132 | 128 | 5.9 |
| A-2 | — | 19.2 | 122 | 133 | 8.1 |
| A-3 | 2.5 | 11.3 | 128 | 133 | 6.0 |
| A-4 | 8 | — | 132 | 134 | 6.0 |
| A-5 | 3.7 | 3.3 | 137 | 141 | 6.4 |
| A-6 | 5.3 | — | 140 | 141 | 6.6 |

A-1: Noblen ® FL6741G, manufactured by Sumitomo Chemical Co., Ltd.
A-2: It was produced by controlling hydrogen concentration and comonomer concentration according to a method described in JP08-245846A.
A-3: Noblen ® SP68E1, manufactured by Sumitomo Chemical Co., Ltd.
A-4: Noblen ® FSX66E3, manufactured by Sumitomo Chemical Co., Ltd.
A-5: Noblen ® FLX64F7, manufactured by Sumitomo Chemical Co., Ltd.
A-6: Noblen ® FL6412, manufactured by Sumitomo Chemical Co., Ltd.

TABLE 2

| Copolymer (B) | CXS component (% by weight) | Ethylene content in CXS component (mol %) | Heat seal temperature (° C.) | MFR (g/10 min.) | $[\eta]_x$ (dl/g) | $[\eta]_y$ (dl/g) |
|---|---|---|---|---|---|---|
| B-1 | 24.2 | 23.5 | 134 | 2.9 | 3.0 | 3.8 |
| B-2 | 13.5 | 24.8 | 137 | 2.6 | 3.0 | 3.4 |
| B-3 | 13.3 | 36.8 | 166 | 2.1 | 2.8 | 2.7 |

B-1: Excellen EPX KS37G1, manufactured by Sumitomo Chemical Co., Ltd.
B-2: Excellen EPX KS37F3, manufactured by Sumitomo Chemical Co., Ltd.
B-3: Noblen ® KS23F8, manufactured by Sumitomo Chemical Co., Ltd.

Examples 1 to 8 and Comparative Examples 1 to 8

Films were prepared at compounding ratios shown in Table 3, and the physical properties of the films are shown in Table 3.

TABLE 3

| | Copolymer (A) ratio (% by weight) | Copolymer (B) ratio (% by weight) | Heat seal temperature (° C.) | | | Haze (%) | YM (MD/TD) (Kg/cm$^2$) |
|---|---|---|---|---|---|---|---|
| | | | TA | TB | TC | | |
| Example 1 | A-1/90 | B-1/10 | 132 | 134 | 128 | 3.3 | 4200/4200 |
| Example 2 | A-1/70 | B-1/30 | 132 | 134 | 126 | 4.0 | 3500/3600 |
| Example 3 | A-1/50 | B-1/50 | 132 | 134 | 128 | 4.9 | 3100/3000 |
| Example 4 | A-2/70 | B-1/30 | 122 | 134 | 113 | 2.9 | 2900/2900 |
| Example 5 | A-1/70 | B-2/30 | 132 | 137 | 129 | 3.5 | 4000/4100 |
| Example 6 | A-2/70 | B-2/30 | 122 | 137 | 116 | 2.0 | 2900/3200 |
| Comparative Example 1 | A-1/100 | — | 132 | — | — | 3.0 | 4500/4500 |
| Comparative Example 2 | A-1/30 | B-1/70 | 132 | 134 | 130 | 5.3 | 2400/2400 |
| Comparative Example 3 | — | B-1/100 | — | 134 | — | 6.3 | 1700/1700 |
| Comparative Example 4 | — | B-2/100 | — | 138 | — | 5.8 | 3000/2900 |
| Comparative Example 5 | A-1/70 | B-3/30 | 132 | 166 | 143 | 11.9 | 4100/4200 |
| Comparative Example 6 | — | B-3/100 | — | 166 | — | 30.5 | 5100/4600 |
| Example 7 | A-3/70 | B-1/30 | 128 | 134 | 121 | 2.6 | 3100/3100 |
| Example 8 | A-4170 | B-1/30 | 132 | 134 | 129 | 2.5 | 3400/3500 |
| Comparative Example 7 | A-5/70 | B-1/30 | 137 | 134 | 137 | 7.0 | 4400/4500 |
| Comparative Example 8 | A-6/70 | B-1/30 | 140 | 134 | 140 | 5.9 | 4500/4400 |

Example 9

A powder of a propylene-based copolymer was obtained, using a catalyst containing Ti, Mg and halogen as an essential component, by polymerizing 9% by weight of the total amount of a propylene-1-butene copolymer part having a 1-butene content of 9.2 mol % in a first step, then by polymerizing 91% by weight of the total amount of a propylene-1-butene copolymer part having a 1-butene content of 20.7 mol % in a second step.

To 100 parts by weight of a powder of this copolymer was added 0.05 parts by weight of calcium stearate, 0.15 parts by weight of Irganox 1010 manufactured by Ciba Specialty Chemicals k.k., 0.05 parts by weight of Irgafos 168 manufactured by Ciba Specialty Chemicals k.k., 0.11 parts by weight of erucamide and 0.16 parts by weight of Sylysia 550 manufactured by Fuji Silysia and they were mixed and melt-kneaded to obtain pellets of a propylene-based copolymer (A-7). The pellet had a MFR of 6.0.

85% by weight of the above-mentioned propylene-based copolymer (A-7) and 15% by weight of a propylene-ethylene block copolymer (B-1), Excellen EPX KS37G1 manufactured by Sumitomo Chemical Co., Ltd. (MFR: 2.9 g/10 min., CXS component content: 23.5 wt %, $[\eta]_{x\,part}$: 3.0 dl/g, $[\eta]_{y\,part}$: 3.8 dl/g) were dry-blended, extruded using a φ 50 mm extruder equipped with a 400 mm width coat hanger type T die at a resin temperature of 250° C. and a discharge amount of 12 kg/hr, and cooled by an air chamber cooling mode at a chill roll temperature of 40° C. and a line speed of 20 m/min., to make a film having a thickness of 30 μm. The evaluation results of the physical properties of the resulted film are shown in Table 4.

Example 10

The same procedure was carried out as in Example 9 except that the compounding proportions of the propylene-based copolymer (A-7) and the propylene-ethylene block copolymer (B-1), Excellen EPX KS37G1 manufactured by Sumitomo Chemical Co., Ltd. were changed to 70% by weight and 30% by weight, respectively. The evaluation results of the resulted film are shown in Table 4.

Example 11

The same procedure was carried out as in Example 9 except that the compounding proportions of the propylene-based copolymer (A-7) and the propylene-ethylene block copolymer (B-1), Excellen EPX KS37G1 manufactured by Sumitomo Chemical Co., Ltd. were changed to 50% by weight and 50% by weight, respectively. The evaluation results of the resulted film are shown in Table 4.

Example 12

The same procedure was carried out as in Example 8 except that the propylene-based copolymer (A-7) was substituted with a propylene-based copolymer (A-8) obtained, using a catalyst containing Ti, Mg and halogen as an essential component, by polymerizing 10% by weight of the total amount of a propylene-1-butene copolymer part having 1-butene content of 6.6 mol % in a first step, then by polymerizing 90% by weight of the total amount of a propylene-1-butene copolymer part having 1-butene content of 21.8 mol % in a second step. The evaluation results of the resulted film are shown in Table 4.

Comparative Example 9

The same procedure was carried out as in Example 9 except that the propylene-ethylene block copolymer (B-1), Excellen EPX KS37G1 manufactured by Sumitomo Chemical Co., Ltd. was not blended. The evaluation results of the resulted film are shown in Table 4.

Comparative Example 10

The same procedure was carried out as in Example 10 except that the propylene-ethylene block copolymer (B-1), Excellen EPX KS37G1 manufactured by Sumitomo Chemical Co., Ltd. was not blended. The evaluation results of the resulted film are shown in Table 4.

Comparative Example 11

The same procedure was carried out as in Example 8 except that the propylene-based copolymer (A-7) was substituted with a propylene-1-butene copolymer (A-9) obtained by one-stage polymerization using a catalyst containing Ti, Mg and halogen as an essential component. The evaluation results of the resulted film are shown in Table 4.

TABLE 4

|  | Copolymer (ii)/compounding proportion (wt %) | Copolymer (B)/compounding proportion (wt %) | Haze (%) | Heat seal temperature (° C.) | Impact strength (0° C.) (kg · cm/mm) |
|---|---|---|---|---|---|
| Example 9 | A-7/85 | B-1/15 | 4.4 | 110 | 96 |
| Example 10 | A-7/70 | B-1/30 | 5.0 | 109 | >100 |
| Example 11 | A-7/50 | B-1/50 | 5.1 | 107 | >100 |
| Example 12 | A-8/70 | B-1/30 | 5.3 | 101 | >100 |
| Comparative Example 9 | A-7/100 | — | 4.9 | 116 | 78 |
| Comparative Example 10 | A-8/100 | — | 6.7 | 114 | 91 |
| Comparative Example 11 | A-9/70 | B-1/30 | 5.8 | 117 | 39 |

According to the present invention, a polypropylene-based film excellent in low temperature heat sealability and transparency, and a multi-layer film having at least one layer of said film, can be provided.

What is claimed is:

1. A polypropylene-based resin film composed of a resin composition (C) comprising:

40 to 95% by weight of (A) a propylene-based copolymer selected from the group consisting of a propylene random copolymer (i) of propylene with ethylene and/or α-olefins having 4 or more carbon atoms and a propylene-based copolymer (ii) composed of 1 to 30% by weight of a copolymer component (a) having a content of α-olefins having 4 or more carbon atoms of 1 mol % and less than 15 mol % and an ethylene content of 5 mol % or less, obtained by polymerizing propylene, an α-olefin having 4 or more carbon atoms and further optionally ethylene in a first step and 70 to 99% by weight of a copolymer component (b) having a content of α-olefins having 4 or more carbon atoms of 15 to 30 mol % and an ethylene content of 5 mol % or less, obtained by polymerizing propylene, an α-olefin having 4 or more carbon atoms and further optionally ethylene in a second step or later steps; and 5 to 60% by weight of (B) a polypropylene-based block copolymer (B) having a content of 20° C. xylene-soluble component of 5.0% by weight or more, wherein the 20° C. xylene-soluble component is a copolymer of propylene with ethylene and/or an α-olefin having 4 or more carbon atoms, having a content of an ethylene unit derived from ethylene and/or an α-olefin unit derived from the α-olefin of 14 to 35 mol %, and wherein the heat seal temperature showing a seal strength of 300 g of the film of the resin composition (C) is lower by 3° C. or more than those of respective films of the polypropylene-based copolymer (A) and the polypropylene-based block copolymer (B).

2. The polypropylene-based resin film according to claim 1, wherein a fusion peak temperature of the propylene random copolymer (i) measured by using a differential scanning calorimeter is 140° C. or less.

3. The polypropylene-based resin film according to claim 1, wherein the copolymer component (a) in the propylene-based copolymer (ii) is a copolymer of propylene with an α-olefin having 4 or more carbon atoms and the copolymer component (b) in the propylene-based copolymer (ii) is a copolymer of propylene with an α-olefin having 4 or more carbon atoms.

4. The polypropylene-based resin film according to claim 1, wherein the content of 20° C. xylene-soluble component in the polypropylene-based block copolymer (B) is 5.0 to 40% by weight.

5. The polypropylene-based resin film according to claim 1, wherein the limiting viscosity of the 20° C. xylene-soluble component in the polypropylene-based block copolymer (B) ($[\eta]^{(B)}$cxs) is 2.0 dl/g or less measured using tetralin as a solvent at a temperature of 135° C.

6. The polypropylene-based resin film according to claim 1, wherein the content of the polypropylene-based random copolymer (A) is 60 to 95% by weight and the content of the polypropylene-based block copolymer (B) is 5 to 40% by weight, in the resin composition (C).

7. The polypropylene-based resin film according to claim 1, wherein the polypropylene-based block copolymer (B) is a polypropylene-based block copolymer which comprises an x part and a y part, wherein the x part is an ethylene-propylene-α-olefin copolymer which comprises an ethylene content of 2.0 to 9.0 mol % and an u-olefin content of 0 to 20.0 mol %, obtained by polymerizing 40 to 85% by weight of the total weight of the x part and y part in a first step in which an inactive solvent is substantially absent using a Ziegler-Natta catalyst and wherein the y part is an ethylene-propylene-α-olefin copolymer which comprises an ethylene content of 10.0 to 24.0 mol % and an α-olefin content of 0 to 29.0 mol %, obtained by polymerizing 15 to 60% by weight of the total weight of the x part and y part in a second step conducted in gas phase and in which the limiting viscosity of the y part ($[\eta]^{(B)}$ y part) is 2.0 to 5.0 dl/g and the ratio of the limiting viscosity of the y part ($[\eta]^{(B)}$ y part) to the limiting viscosity of the x part ($[\eta]^{(B)}$ x part) is from 0.5 to 1.8 ($0.5 \leq [\eta]^{(B)}$ y part/$[\eta]^{(B)}$ x part $\leq 1.8$).

8. The polypropylene-based resin film according to claim 7, wherein the α-olefin content of the ethylene-propylene copolymer part (x part) and the α-olefin content of the ethylene-propylene copolymer part (y part) are 0 mol %.

9. A polypropylene-based multi-layer film, comprising at least one layer of the polypropylene-based resin film of claim 1.

* * * * *